T. L. COURTNEY.
SHOCK ABSORBING WHEEL FOR MOTOR CARS.
APPLICATION FILED SEPT. 22, 1920.
1,430,949.
Patented Oct. 3, 1922.
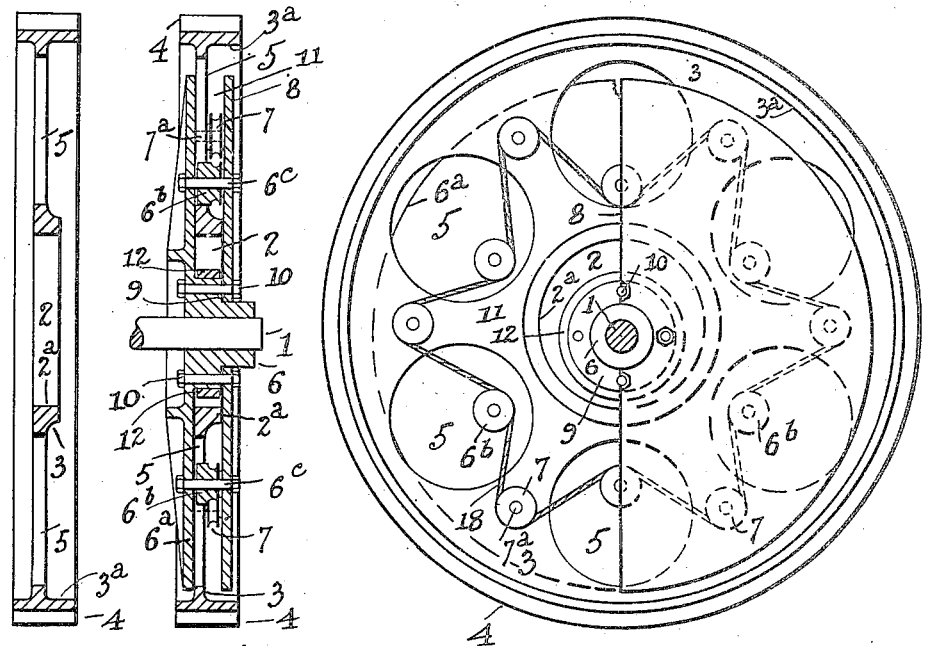
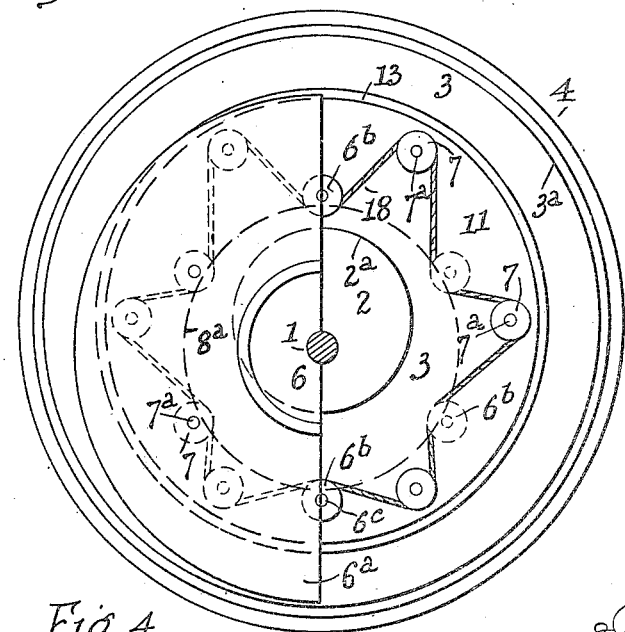

Patented Oct. 3, 1922.

1,430,949

UNITED STATES PATENT OFFICE.

THOMAS LEE COURTNEY, OF WYCHITELLA, VICTORIA, AUSTRALIA, ASSIGNOR OF TWO-THIRDS TO HUGH KEITH (JUNIOR), OF WYCHITELLA, VICTORIA, AUSTRALIA.

SHOCK-ABSORBING WHEEL FOR MOTOR CARS.

Application filed September 22, 1920. Serial No. 412,005.

*To all whom it may concern:*

Be it known that I, THOMAS LEE COURTNEY, a subject of the King of Great Britain and Ireland, etc., residing at Wychitella, in the State of Victoria, Commonwealth of Australia, have invented certain new and useful Improvements in Shock-Absorbing Wheels for Motor Cars; and I do hereby declare the following to be a full, clear, and exact description of the invention, such as will enable others skilled in the art to which it appertains to make and use the same.

For motor cycles, motor cars, and other vehicles, there are provided by this invention improved wheels having shock absorbing properties. When shocks occur by reason of road inequalities, parts of the wheels move so as to absorb the shocks to a considerable extent.

In the drawings herewith the application of the invention is illustrated but the construction may be varied in minor respects while retaining matter hereinafter claimed.

Figure 1 is a side view (omitting half of a near side cheek) showing one form of the road wheel fitted to its axle which is supposed to be bearing the weight of a car.

Figure 2 is an end view in vertical section of the said road wheel, omitting the tension band hereinafter described.

Figure 3 shows the wheel body in vertical section, omitting its attachments.

Figure 4 shows in side view (omitting half of a near side cheek) the wheel modified; and Figure 5 shows a vertical transverse section of the modified wheel, omitting its tension band. These wheels are to be fitted to axles in any convenient manner, and each may have a solid or a pneumatic tyre.

In these drawings the road wheel axle 1 extends through a large hole 2, having a thickened circular rim $2^a$, in the road wheel body 3, which has an outer circular rim $3^a$ which carries any suitable tyre 4. The said body may be apertured near the rim at regular intervals circumferentially by having, as in Figures 1 to 3, relatively large holes 5 which have circular or curved peripheries.

The wheel hub 6, has extending from it an integral or separable cheek $6^a$ which carries spaced equidistantly around it axles $6^c$ each axle projecting inwardly and carrying a rotatable pulley $6^b$, which has a channel for a tension band 18.

The wheel body 3 carries a series of axles each projecting so as to carry a rotatable pulley 7 having also a channel for the tension band. The pulley channels are in one plane so that the flexible cable or tension band 18 will be retained in the grooves of both series of pulleys during travel. This tension band or cable engages the pulleys of each groove alternately as shown. The band is endless, or may have ends drawn together more or less tightly at the will of the user.

It will be noted that the tension cable is free and unsecured at any point, thus permitting flexibility thereof for its whole length and also permitting of a creeping action while in use, all of which tends to give better shock resisting qualities to the device.

In Figures 1 and 2 the wheel carries a cheek 8 opposite to and spaced from cheek $6^a$ by fitting against a shoulder 9 on hub 6; and rim $2^a$ also by reason of its thickness acts in some cases (as in the case shown) as a spacing member.

Cheek 8 is fastened to the hub and to cheek $6^a$ by bolts 10 and $6^c$. All of the pulleys are located within a space 11 which is provided between the wheel body, and a cheek. The pulleys and the tension band are thus well protected from injury during travel of the wheel. The tension band 18 is fitted without slackness to the wheel while wheel body 3 is located concentrically with axle 1; but owing to its flexible nature the band allows the axle to rise and fall somewhat during travel of the wheel, the car weight depressing it more or less. The movability of the axle in a vertical plane thus ensured causes the wheel to be shock absorbing.

It may occur during travel of the road wheel that one or more pulleys $6^b$ will contact with the rim of an adjacent hole 5; this will depend on the weight on the axle, the road inequalities, the speed of travel, and the movability or yield of the tension band or cable.

As shown in Figures 1 and 2, there may be a ring 12 located between the wheel hub and the rim of body hole 2, this ring being useful to reduce friction.

As it is not essential to provide holes 5, or the precise form of cheek shown by 8, Figures 4 and 5 show a body 2 having no holes 5, and having a modified cheek $8^a$ attached to the hub, while the plley chamber 11 between cheeks 6ª and body 3, is made by providing an annular flange 13 on body 3.

Having described this invention, what is claimed is:—

1. A shock absorbing road wheel having a centrally apertured body enclosing the wheel hub loosely and fitted with projecting axles carrying each a pulley, a cheek at each side of the body, one of said cheeks being an extension from the wheel hub and supporting a series of axles, a series of pulleys each on a cheek supported axle and an endless tension band alternately engaging pulleys of each series, said band being free and unsecured at any point in its length whereby to permit it to have a creeping action, the pulleys and band being located, within a chamber between the wheel body and a cheek.

2. A shock absorbing road wheel having a centrally apertured body enclosing the wheel hub loosely and fitted with projecting axles carrying each a pulley, a cheek at each side of the body, one of said cheeks being an extension from the wheel hub and supporting a series of axles, a series of pulleys each on one of the last-mentioned axles, and an endless tension band alternately engaging the pulleys of each series, said band being free and unsecured at any point in its length whereby to permit it to have a creeping action, the pulleys and band being located within a chamber between the wheel body and a cheek.

In witness whereof I have hereunto set my hand.

THOMAS LEE COURTNEY.